United States Patent [19]
Johansson et al.

[11] Patent Number: 5,421,526
[45] Date of Patent: Jun. 6, 1995

[54] METHOD OF RECOVERING INDIVIDUAL COMPONENT PARTS FROM PACKAGING MATERIAL WASTE

[75] Inventors: Hans Johansson, Veberöd, Sweden; Paul W. Ackermann, Leinfelden-Echterdingen, Germany

[73] Assignee: Tetra Laval Holdings & Finance SA, Pully, Switzerland

[21] Appl. No.: 888,610

[22] Filed: May 27, 1992

[30] Foreign Application Priority Data

May 29, 1991 [SE] Sweden .................. 9101634-5

[51] Int. Cl.⁶ .................................. B02C 19/12
[52] U.S. Cl. .......................... 241/20; 241/24; 241/DIG. 38
[58] Field of Search ........... 241/20, 24, 79.1, DIG. 38

[56] References Cited

U.S. PATENT DOCUMENTS

| | | |
|---|---|---|
| 3,741,863 | 8/1971 | Brooks . |
| 3,814,240 | 6/1974 | Laundrie .................. 209/11 |
| 3,925,150 | 12/1975 | Marsh ...................... 162/4 |
| 4,017,033 | 4/1977 | Tra .......................... 241/28 |
| 4,022,638 | 5/1977 | Weet ........................ 134/1 |
| 4,231,526 | 11/1980 | Ortner et al. ............. 241/28 |
| 4,242,129 | 12/1980 | Kellerwessel et al. ..... 75/109 |
| 4,272,315 | 6/1981 | Espenmiller .............. 162/4 |
| 4,283,275 | 8/1981 | Heinbockel et al. ...... 209/3 |
| 4,314,674 | 2/1982 | Cerroni ..................... 241/14 |
| 4,570,861 | 2/1986 | Zentgraf et al. ........... 241/24 |
| 4,667,885 | 5/1987 | Datta ........................ 241/16 |
| 4,681,266 | 7/1987 | Mason et al. ............. 241/18 |
| 4,981,876 | 1/1991 | Grimmer .................. 521/46.5 |

FOREIGN PATENT DOCUMENTS

| | | | |
|---|---|---|---|
| 3002061 | 7/1981 | Germany ................. | 241/20 |
| 60-212434 | 10/1985 | Japan . | |
| 1417260 | 12/1975 | United Kingdom . | |
| 9014890 | 12/1990 | WIPO ...................... | 241/DIG. 38 |

*Primary Examiner*—John Husar
*Attorney, Agent, or Firm*—Burns, Doane, Swecker & Mathis

[57] ABSTRACT

A method of recovering individual material components such as metal, plastic and, where applicable, paper or cardboard, from waste of laminated packaging material comprising layers of metal, plastic and possibly paper or cardboard. The layers of metal and plastic are separated from each other and from the possibly present paper or cardboard layer by treating the waste with an organic acid or a mixture of organic acids selected from among formic acid, acetic acid, propanoic acid, butyric acid and similar volatile organic acids, preferably acetic acid alone.

18 Claims, 1 Drawing Sheet

METHOD OF RECOVERING INDIVIDUAL COMPONENT PARTS FROM PACKAGING MATERIAL WASTE

FIELD OF THE INVENTION

The present invention relates to a method of recovering individual material components from packaging material waste. More particularly, the present invention pertains to a method of recovering individual material components such as metal, plastic and, where applicable, paper or cardboard, from waste of laminated packaging material comprising layers of metal, plastic and possibly paper or cardboard.

BACKGROUND OF THE INVENTION

Within the field of the packaging industry, immense and constantly increasing quantities of consumer packages of the single-use type (so-called disposable cartons) are produced annually. The material in these packages varies depending upon which type of product is to be packed, but most of these packages generally consist of a plurality of layers laminated to one another which are intended together to impart to the package the desired superior product protection properties. For liquid foods, use is usually made of a packaging material composed of plastic layers and paper or cardboard layers, this material being, particularly in the case of oxidation and bacteria sensitive foods, optionally complemented with at least one additional layer of metal (eg. aluminium foil) or other material with the desired barrier properties. Thus, one prior art packaging material for, for instance, milk consists of an inner rigidifying base layer of paper or cardboard and outer liquid-tight layers of plastic, while a corresponding packaging material for juice and other particularly oxidation and/or bacteria sensitive foods may additionally be provided with an aluminium foil disposed between the above-mentioned layers.

Concurrently with the growing production output of single-use packages, the amount of waste produced will naturally enough increase as well, this laminated packaging material waste including both domestic refuse (used whole cartons) and industrial waste (rejects of incorrectly produced packages and other production waste). The term "laminated packaging material waste" is therefore taken to signify all waste consisting of laminated packaging material, irrespective of the stage in the chain of distribution of the packages from which this waste derives.

Since the waste contains valuable and also—for all intents and purposes—pure material components such as plastic, metal (aluminium foil) and paper or cardboard which separately, but to an even greater degree severally constitute a major economic resource, it has always been desirable in the art to be able to recover, in the best possible way and to as great an extent as possible, the economic potential represented in the waste. This problem has recently been given even more prominence as a result of more stringent governmental requirements on waste management.

OBJECTS OF THE INVENTION

One object of the present invention is therefore to propose a method by means of which individual material components may be recovered from laminated packaging material waste.

A further object of the present invention is to propose a method by means of which the contemplated material components may be recovered without the use of environmentally stressing or environmentally destructive hazardous chemicals such as solvents, strong acids and salts etc.

SUMMARY OF THE INVENTION

These and other objects and advantages will be attained according to the present invention in that a method for recovering individual component parts from packaging material includes treating the waste with an organic acid or a mixture of organic acids in order to separate the above-mentioned layers of metal and plastic from each other and from the possibly present paper or cardboard layer.

Examples of acids which may be employed in the method according to the invention are formic acid, acetic acid, propanoic acid, butyric acid and similar volatile organic acids, individually or in optional mutual combinations with each other. Citric acid, sorbic acid and lactic acid, individually or in mutually optional combinations with each other or with the previously-mentioned acids constitute further examples of usable acids according to the invention. Foremost among these acids, formic acid and acetic acid are to be preferred, preferably acetic acid without the presence of any other acid.

The separation of the above-mentioned plastic layer and metal layer from each other and from other material layers present in the waste will be improved and accelerated if the waste is comminuted mechanically (shredded, chopped etc.) prior to the treatment with the acid or acids, respectively. Similarly, separation efficiency will be improved if the waste is agitated or kept in motion by other suitable means during the acid treatment and/or if the treatment is carried out at an elevated temperature, preferably above 50° C.

BRIEF DESCRIPTION OF THE ACCOMPANYING DRAWINGS

The invention will be described in greater detail hereinbelow, with particular reference to the accompanying Drawings.

In the accompanying Drawings:

FIGS. 1 and 2 schematically illustrate conventional packaging materials from which individual material components may be recovered using the method according to the invention as schematically illustrated in FIG. 3.

DETAILED DESCRIPTION OF THE PREFERRED EMBODIMENT

Figure 1:
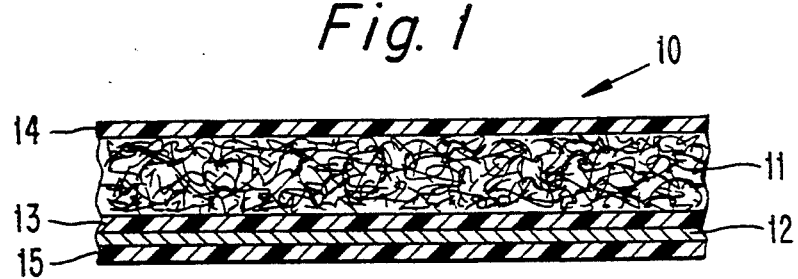

The laminated packaging material in FIG. 1 has been given the generic reference numeral 10. The packaging material 10 has a base layer 11 of paper or cardboard and an aluminium foil 12 applied against one face of the base layer and bonded to the base layer with the aid of an interjacent sealing layer 13 of polythene. The packaging material 10 is moreover provided with outer sealing/protective layers 14 and 15 of polythene.

Figure 2:
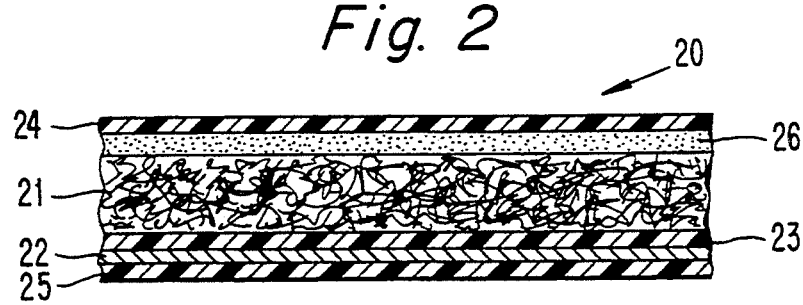

FIG. 2 illustrates a further prior art packaging material which has been given the generic reference numeral 20. The packaging material 20 is, in all essentials, structured in the same manner and from the same material layers as the packaging material 10 of FIG. 1, apart from the fact that the one face of the base layer 21 is coated by a layer 26 of clay (clay coat) applied between the outer protective/sealing layer 24 and the base layer 21. The packaging material 20 displays an aluminium foil 22 which is bonded to the base layer 21 with the aid of an interjacent sealing layer 23 of polythene, as well as an outer protective/sealing layer 25 of polythene bonded to the aluminium foil 22.

Hereinafter, particular reference will be made to FIG. 3 which schematically illustrates how individual material components may be recovered from waste of laminated packaging material according to the method of the present invention.

The laminated packaging material may be a material of the type illustrated in FIGS. 1 and 2 and including layers of both plastic, aluminium and paper or cardboard, but could just as well be a laminated paper or cardboard material which, in a preceding operation, has already been defibered and, consequently, only comprises layers of plastic and aluminium. In this illustrative embodiment, it is, however, assumed that the laminated packaging material consists of a mixture of the materials shown in both FIGS. 1 and 2. It will further be assumed that the waste includes both whole used cartons and parts of cartons produced from one or both of these packaging materials.

In a first treatment stage (at 30), the waste is subjected to a mechanical comminution operation in order to reduce the waste into small pieces (eg. 5×5 cm). This comminution can be effected in that the waste is shredded, chopped or otherwise mechanically disintegrated using conventional equipment for this purpose.

In a subsequent treatment stage (at 31), the comminuted waste is treated with acid or a mixture of acids, with the aid of which the plastic layers 15; 24, 23 and 25 and the aluminium layers 12; 22 are separated from one another and from other material layers included in the waste, i.e. the paper or cardboard layer 11 with the outer plastic layer 14 and the paper or cardboard layer 21 with the clay coat 26. The above-mentioned acid or acids are selected from among volatile organic acids such as formic acid, acetic acid, propanoic acid, butyric acid etc., or other organic acids such as citric acid, sorbic acid, lactic acid etc. Ideally, the acid consists of acetic acid without the presence of any other acid, since acetic acid, in addition to its superior separation capability, also possesses other especially valuable properties such as biocompatibility and environmental compatibility, and also bactericidal properties which make for the effective destruction of any possible pathogenic bacteria and other microorganisms present in the waste. The acetic acid is added in the form of an aqueous solution containing the acetic acid in an amount of between 40 and 100, preferably between 75 and 100 weight %. In order to accelerate the chemical delamination of the waste, the treatment with acid is effected at an elevated temperature, preferably above 50° C. Very good separation efficiency is achieved using an aqueous solution containing approx. 80 weight % acetic acid at 80° C.

After the treatment with the acid or acids, respectively, the fragmented material layers are separated from each other in a third treatment stage (at 32). This separation stage may be effected in a known manner using cyclones or like conventional apparatus which separate the materials according to their mutually differing densities. Thus, there will be obtained from the third treatment stage, i) a "fibre/plastic" fraction comprising the paper or cardboard layer 11 with adherent plastic layers 13 and 14 and the paper or cardboard layer 21 with the plastic layer 23; ii) a "metal" fraction comprising the aluminium layers 11 and 21; iii) a "plastic" fraction comprising the plastic layers 15 as well as 24 and 25; and iiii) a "liquid" fraction comprising spent treatment acid and diverse other residual components in the treated waste, such as particles of the clay coat 26.

The separated metal fraction is washed with water, rinsed and dried and may thereafter be melted and formed into new foil for use in the production of new laminated packaging material.

Similarly, the thus obtained plastic fraction may, after washing, rinsing and drying, be melted and formed into granules for extrusion.

The liquid fraction from treatment stage 33 contains substantially spent acid solution and may possibly, after dilution with water and/or neutralization, be discharged directly into a waste disposal system. Such emissions may be carried out without risk to the environment or risk of bacterial pollution, since those acids employed for carrying the method according to the present into practice are harmless to the environment and to general health, and are in addition sufficiently bactericidal to destroy any possible pathogenic bacteria and other infectious microorganisms which may be present in the treated waste.

Figure 3:
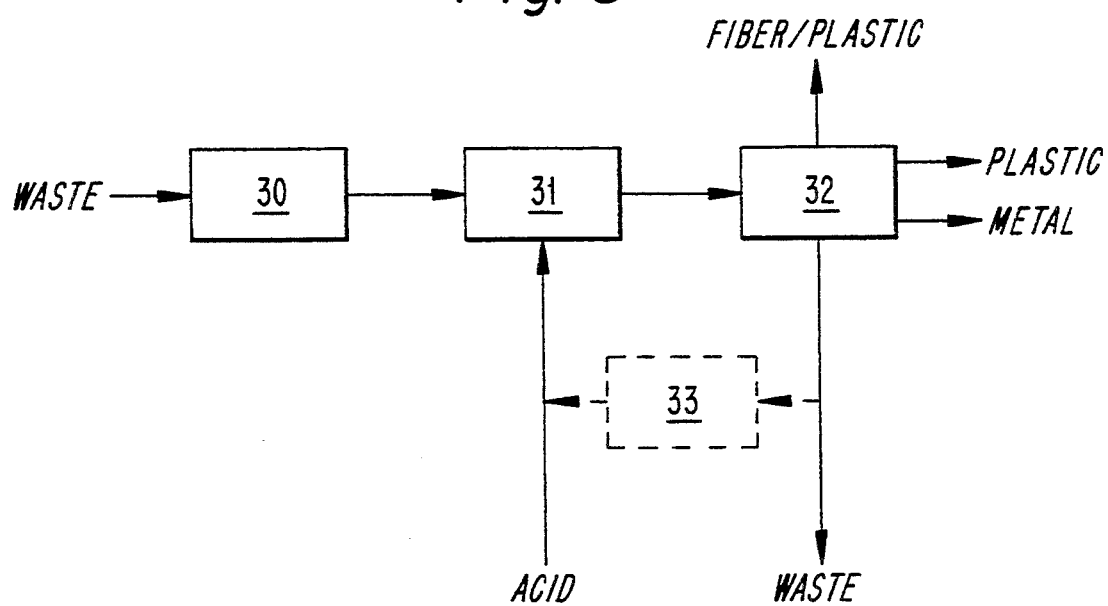

However, according to the invention it is preferably possible to recycle the spent acid solution from the treatment stage 32, as is schematically intimated by the broken lines in the region beneath treatment stages 31 and 32 in FIG. 3. In such instance, the acid solution is subjected to regeneration treatment at stage 33, which may be effected by distillation or other conventional purification technique, eg. filtration, by means of which the acid is freed of possible impurities (eg. clay particles). After regeneration, the acid is recycled to treatment stage 31 for re-use.

From the fibre/plastic fraction obtained at treatment stage 32, the paper or cardboard fibres are separated off and may thereafter be used as starting materials for the production of various paper or cardboard qualities.

Hence, as will have been apparent from the foregoing description, it is possible according to the present invention effectively to recover individual material components such as plastic, metal (Al) and paper or cardboard from a waste of laminated packaging material comprising layers of plastic, metal (aluminium) and paper or cardboard. In particular, the present invention makes possible recovery of such material components in chemically as good as unaffected or untainted form without the use of environmentally stressing or environmentally destructive, hazardous chemicals such as organic solvents etc.

While this invention has been illustrated and described in accordance with a preferred embodiment, it is recognized that variations and changes may be made and equivalents employed herein without departing from the invention as set forth in the claims.

We claim:

1. A method of recovering at least metal and plastic from waste of laminated packaging material which comprises layers of at least metal and plastic, the method comprising treating the waste with organic acid to separate said layers of metal and plastic from each other.

2. The method as claimed in claim 1, wherein said organic acid is selected from among formic acid, acetic acid, propanoic acid, and butyric acid.

3. The method as claimed in claim 1, wherein the organic acid is present in an aqueous solution, the aqueous solution containing said organic acid in an amount between 40 and 100 weight %.

4. The method as claimed in claim 3, wherein the treatment with the aqueous solution is carded out at a temperature above 50° C.

5. The method as claimed in claim 3, wherein the packaging material waste is mechanically comminuted prior to treatment with the aqueous solution.

6. The method as claimed in claim 3, wherein the waste of the packaging laminated material is kept in motion during the treatment with the aqueous solution.

7. The method as claimed in claim 1, wherein the separated plastic and metal material components are individually recovered in a subsequent density-based separation treatment.

8. The method as claimed in claim 1, wherein said organic acid comprises a mixture of organic acids.

9. The method as claimed in claim 1, wherein said organic acid is a volatile organic acid.

10. The method as claimed in claim 1, wherein said organic acid is selected from the group of formic acid, acetic acid, propanoic acid, butyric acid, citric acid, sorbic acid and lactic acid, and mixtures thereof.

11. A method of recovering individual component parts from laminated packaging material waste that includes metal, plastic, and paper or cardboard, the method comprising: subjecting the laminated packaging material waste to a comminution operation; treating the comminuted laminated packaging material waste with an aqueous solution that includes organic acid in order to separate the metal, the plastic, and the paper or cardboard from one another; and subjecting the waste which has been treated with an aqueous solution to a further treatment stage in order to separate the plastic, metal and paper or cardboard according to their mutually differing densities.

12. The method according to claim 11, wherein said comminuted laminated packaging material waste is treated with an aqueous solution that is at a temperature above 50° C.

13. The method according to claim 12, wherein said aqueous solution includes said organic acid in an amount of between 40 and 100 weight %.

14. The method according to claim 11, wherein the further treatment stage results in a fiber/plastic fraction, a metal fraction, a plastic fraction, and a liquid fraction.

15. The method according to claim 11, wherein the comminuted laminated packaging material waste is kept in motion during treatment with the aqueous solution.

16. The method according to claim 11, wherein said aqueous solution contains only one acid, said one acid being acetic acid.

17. The method according to claim 11, wherein said organic acid is selected from the group of formic acid, acetic acid, propanoic acid, butyric acid, citric acid, sorbic acid and lactic acid, and mixtures thereof.

18. The method according to claim 11, wherein said organic acid is a volatile organic acid.

* * * * *